US008595706B2

United States Patent
Louis et al.

(10) Patent No.: US 8,595,706 B2
(45) Date of Patent: Nov. 26, 2013

(54) CONTROL CHART TECHNIQUE FOR ANALYZING SOFTWARE ENGINEERING ACTIVITIES AFFECTED BY INTRINSIC PROCESS VARIATION AND STATISTICAL FLUCTUATIONS

(75) Inventors: Peter Louis, Holzkirchen (DE); Katrin Sulzbacher, Gilching-Geisenbrunn (DE)

(73) Assignee: Siemens Aktiengesellschaft, München (DE)

( * ) Notice: Subject to any disclaimer, the term of this patent is extended or adjusted under 35 U.S.C. 154(b) by 1283 days.

(21) Appl. No.: 12/172,476

(22) Filed: Jul. 14, 2008

(65) Prior Publication Data

US 2010/0011346 A1 Jan. 14, 2010

(51) Int. Cl.
*G06F 9/44* (2006.01)

(52) U.S. Cl.
USPC .......................................................... 717/131

(58) Field of Classification Search
USPC .......................................................... 717/131
See application file for complete search history.

(56) References Cited

U.S. PATENT DOCUMENTS

2007/0088776 A1* 4/2007 Whear et al. ................. 709/201

OTHER PUBLICATIONS

Komuro, Mitsumi, "Experiences of Applying SPC Techniques to Software Development Processes," ACM, 2006, 8pg.*
Breyfogle, Forrest W., "Implementing Six Sigma—Smarter Solutions Using Statistical Methods," Second Edition, 2003, Wiley & Sons, pp. 660-700.*
William A. Florac, Anita D. Carleton; "Measuring the Software Process; Statistical Process Control for Software Process Improvement"; Book; 1999.

* cited by examiner

*Primary Examiner* — Li B Zhen
*Assistant Examiner* — Ryan Coyer

(57) ABSTRACT

In software engineering, the performance or efficiency of individual process steps is typically defined as some sort of rate such as the number of detected defects divided by the effort spent for review or testing. In this situation, the variation in the data always reflects a mixture of intrinsic process variation caused by, for example, human factors such as the experience of reviewers or the variable quality of the review objects, and purely statistical variation due to the effects of Poisson statistics when defects are counted. Due to this mixture of causes of variation no conventional statistical process control chart holds for the constraints of typical software engineering processes. A new statistical process control (SPC) approach (method and system) is presented to overcome the mentioned problems.

20 Claims, 6 Drawing Sheets

CONTROL CHART TECHNIQUE FOR ANALYZING SOFTWARE ENGINEERING ACTIVITIES AFFECTED BY INTRINSIC PROCESS VARIATION AND STATISTICAL FLUCTUATIONS

FIELD OF THE INVENTION

The invention generally relates to a method and a system for analyzing the performance of software development process activities by using Statistical Process Control (SPC) techniques. Furthermore the invention relates to a method for presenting performance data of software development process activities in a graphical chart.

BACKGROUND OF THE INVENTION

Statistical Process Control (SPC) is a powerful tool to analyze the stability of processes by using control charts to compare the measurable attributes of the process output against the natural limits of process variation. If the observed variability of the attributes is within the range of variability from natural causes, the process is said to be under statistical control. Depending on the nature of the process and the type of attributes to be analyzed, there exist different control chart types which correspond to different natural causes of variation.

Using Statistical Process Control techniques to analyze and control the performance of process steps in production processes is established and approved for decades. For some years there exist approaches to apply Statistical Process Control (SPC) also for analyzing the performance of software development processes to manage software development efforts and to effect software process improvement.

SUMMARY OF THE INVENTION

Statistical Process Control (SPC) is a powerful tool to analyze the stability of processes by using control charts to compare the measurable attributes of the process output against the natural limits of process variation. If the observed variability of the attributes is within the range of variability from natural causes, the process is said to be under statistical control. Depending on the nature of the process and the type of attributes to be analyzed, there exist different control chart types which correspond to different natural causes of variation. For data which corresponds to continuous physical parameters, the variation across the objects in a sample can be analysed using control charts for variables data (e.g. XmR-Charts), where the natural process limits are derived from the empirical variation in the data. Process stability here means that the observed distribution of the data does not show any pattern and does not include extreme outliers, and the random variation can be explained by natural causes.

On the other hand, counting data whose variation is due to Binomial or Poisson statistics can be analyzed using control charts for attributes data (e.g. c-Charts, u-Charts), where the natural process limits are defined by the underlying statistics. Process stability here means that the observed distribution of the data can be explained by the known properties of the underlying statistics.

In software engineering, the performance or efficiency of individual process steps is typically defined as some sort of rate such as the number of detected defects divided by the effort spent for review or testing. In this situation, the variation in the data always reflects a mixture of intrinsic process variation caused by, for example, human factors such as the experience of reviewers or the variable quality of the review objects, and purely statistical variation due to the effects of Poisson statistics when defects are counted. Due to this mixture of causes of variation, neither of the fundamental assumptions of the two groups of control charts hold for typical software engineering processes. Therefore the usual control chart techniques, which are included in many standard statistics software packages, can not be applied directly to many software engineering processes.

The following short example will illustrate the above mentioned problem: When analyzing the defect detection rate as a measure for review efficiency, control charts for Poisson processes cannot be applied as they assume the there is only variation due to Poisson statistics, which is not true since there is also variation in review efficiency related to experience of the reviewers. On the other hand, the control charts for variable data (e.g. XmR-Charts) assume that, in a stable review process, the defect detection rate should stay within the range defined by the empirically determined control limits, which ignores that due to statistical effects there will be much larger variation in the rate for smaller reviews (few defects found in small documents) than in larger reviews (many defects found in larger documents).

The present invention provides an approach to overcome these problems and drawbacks. One aspect of the present invention is a method for analyzing the performance of software development process activities, the method comprising:

selecting a process activity to be analyzed;

determining a metric describing the performance of the selected process activity;

collecting a statistically sufficient number of metric data on the base of the selected process activities performed; and analyzing the collected metric data and assessing the performance of the software development process activity by applying statistical process control techniques, wherein a variation of the performance is affected by intrinsic process variation and Poisson effects, wherein the collected metric data are each transformed into a distance from a centerline defined by a mean value of the metric data, whereby the metric data are normalized in units of an expected variation due to Poisson effects, and wherein as control limits empirical natural process limits are determined, derived from a moving average of the transformed metric data.

Another aspect of the invention is a method for presenting performance data of software development process activities in a graphical chart, wherein the performance data are gained on the base of statistical process control techniques, wherein collected metric data are each transformed into a distance from a centerline defined by a mean value of the metric data, whereby the metric data are normalized in units of an expected variation due to Poisson effects, wherein as control limits empirical natural process limits are determined, derived from a moving average of the transformed metric data, wherein the distance between the centerline and each of the transformed metric data defines a probability of occurrence and outliers beyond the control limits are interpreted of being provoked by an assignable cause, and depicting the gained performance data in a graphical statistical process control chart.

A further aspect of the invention is a system for analyzing the performance of software development process activities using a metric describing the performance of the selected process activity, the system comprising:

means for collecting a statistically sufficient number of metric data on the base of the selected process activities performed; and means for analyzing the collected metric data and assessing the performance of the software development process activity by applying statistical process control techniques, wherein a performance is affected by intrinsic process variation and Poisson effects, wherein the collected metric data are each transformed into a distance from a centerline defined by a mean value of the metric data, whereby the metric data are normalized in units of an expected variation due to Poisson effects, and wherein as control limits empirical natural process limits are determined, derived from a moving average of the transformed metric data.

BRIEF DESCRIPTION OF THE DRAWINGS

The above-mentioned and other concepts of the present invention will now be addressed with reference to the drawings of the preferred embodiments of the present invention. The shown embodiments are intended to illustrate, but not to limit the invention. The drawings contain the following figures, in which like numbers refer to like parts throughout the description and drawings and wherein.

DESCRIPTION OF THE PREFERRED EMBODIMENTS

Figure 1:
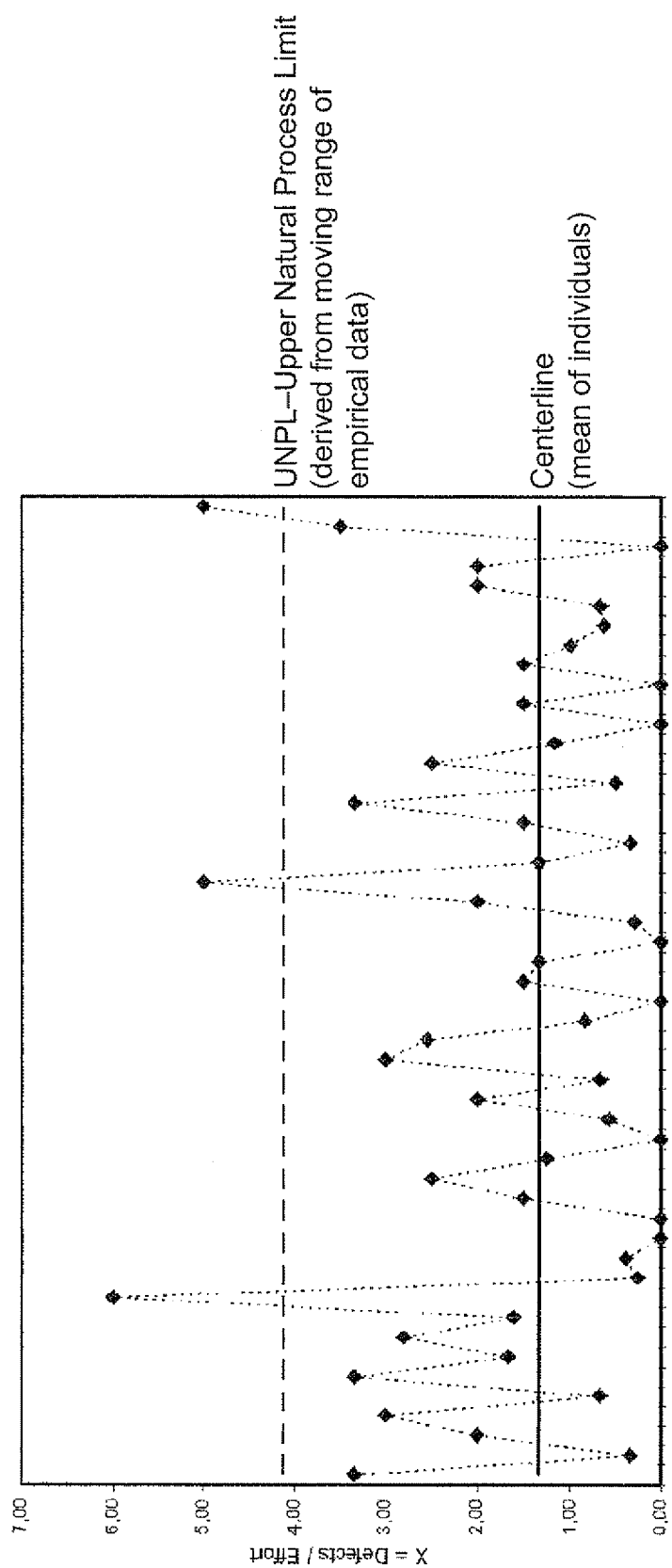
FIG. 1 shows an example of a XmR-Chart.

FIG. 1 shows an example of a XmR-Chart used for analyzing the performance of a process. Depending on the nature of the process and the type of attributes to be analyzed, there exist different control chart types which correspond to different natural causes of variation. For data which corresponds to continuous physical parameters, the variation across the objects in a sample can be analysed using control charts for variables data (e.g. XmR-Charts), where the natural process limits are derived from the empirical variation in the data. Process stability here means that the observed distribution of the data does not show any pattern and does not include extreme outliers, and the random variation can be explained by natural causes.

In the exemplary XmR-Chart of FIG. 1 as metric for describing the performance of selected process activities (e.g. reviews, inspections, tests) the rate X=defects/effort is used. The centerline represents the mean value of analyzed individuals (samples), The Upper Natural Process Limit (UNPL) is derived from moving range of empirical data of the process activity to be analyzed.

The XmR-Chart technique has following disadvantages especially in view of software processes:

XmR-Charts assume that the difference between the individual values and the centerline defines the probability of occurrence, and outliers beyond the natural process limits are so unlikely that there must be an assignable cause.

This ignores effects of Poisson statistics which occur when measuring rates as process attribute. In fact, for small values of the denominator (effort) one must expect larger relative fluctuations in the nominator (defects) than for larger values of the denominator.

Consequently, some apparent outliers beyond the natural process limits might be explained by Poisson variation, whereas other true outliers are not revealed due to the limitations of the presentation of data in XmR-Charts.

Figure 2:
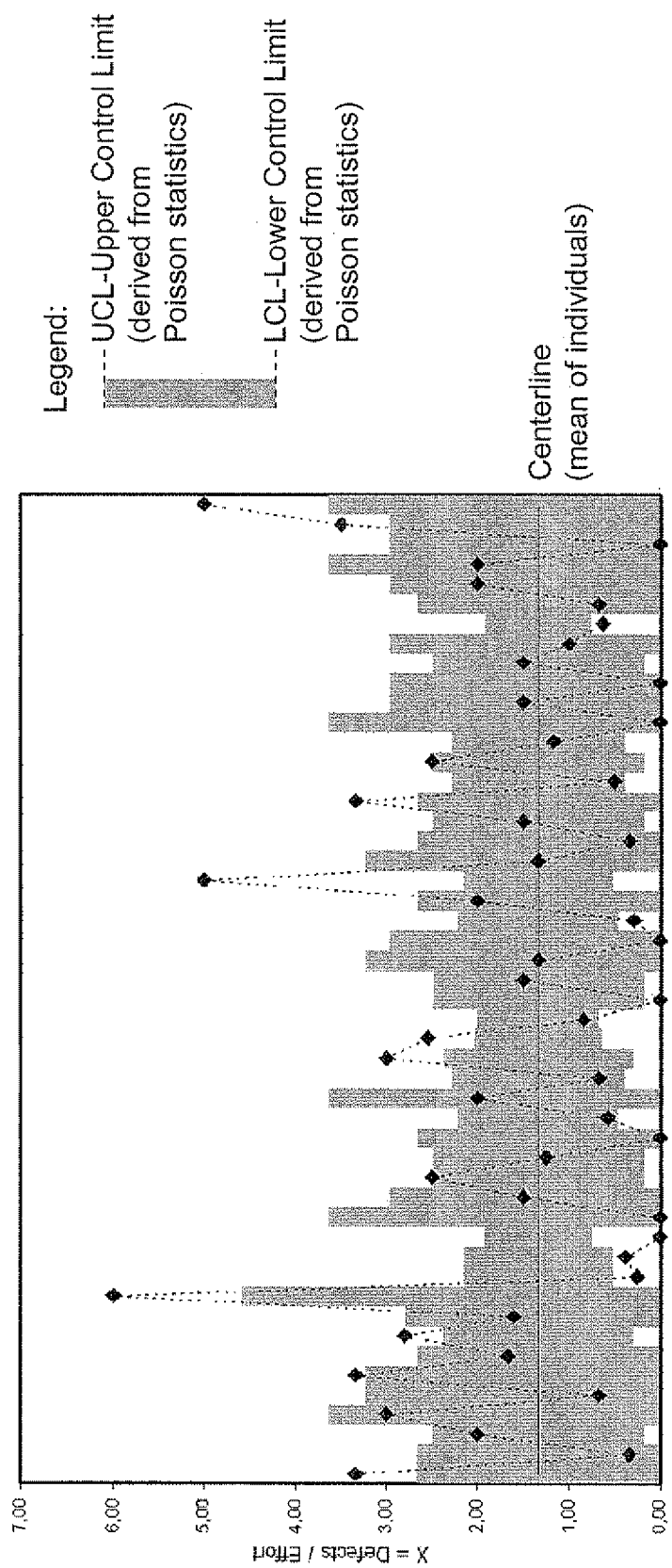
FIG. 2 shows an example of a u-Chart.

FIG. 2 shows an example of a u-Chart used for analyzing the performance of a process. Process data whose variation is due to Binomial or Poisson statistics can be analyzed using control charts for attributes data (e.g. c-Charts, u-Charts, z-Charts), where the natural process limits are defined by the underlying statistics. Process stability here means that the observed distribution of the data can be explained by the known properties of the underlying statistics.

In the exemplary u-Chart of FIG. 2 as metric for describing the performance of selected process activities (e.g. reviews, inspections, tests) the rate X=defects/effort is used. The centerline represents the mean value of analyzed individuals (samples), The respective Upper Control Limits (UCL) and Lower Control Limits (LCL) are derived from Poisson statistics.

The u-Chart technique has following disadvantages especially in view of software processes:

u-Charts assume that Poisson statistics is the only cause of variation. The control limits are here individually calculated for each data point based on the area of opportunity (effort) for each data point.

This ignores that intrinsic variation in the process itself whose attributes are measured contributes to the empirical variation as well. For the review process, the quality of documents and the experience of reviewers are both causes of variation in the measured defect detection rate.

Consequently, the large number of outliers beyond the control limits is no indication of a process out of control, but simply indicates that Poisson statistics is not the only source of variation for the process attributes measures here.

Figure 3:
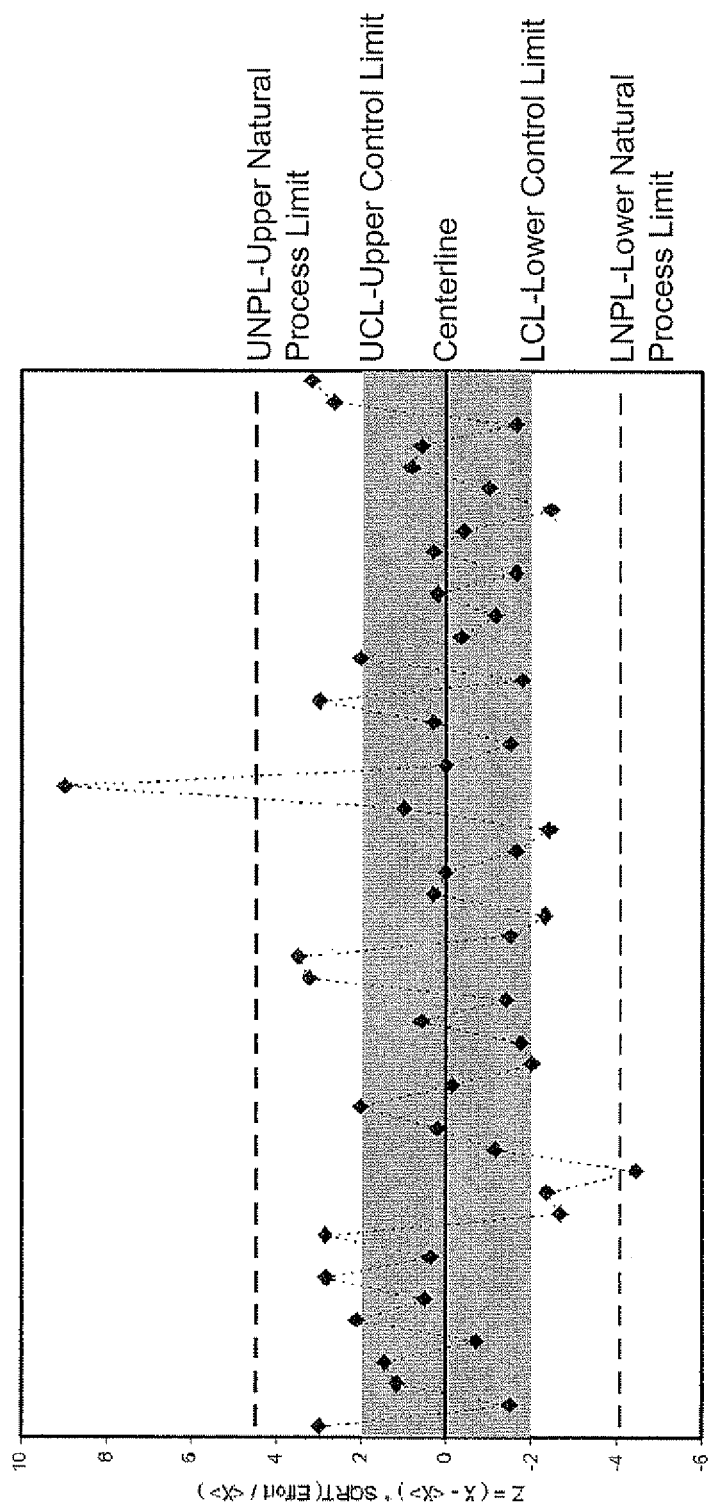
FIG. 3 shows an example of the inventive ZmR-Chart.

FIG. 3 shows an exemplary application of the inventive ZmR-Chart technique to analyze the performance of software process activities. In software engineering, the performance or efficiency of individual process steps is typically defined as some sort of rate such as the number of detected defects divided by the effort spent for review or testing. In this situation, the variation in the data always reflects a mixture of intrinsic process variation caused by, for example, human factors such as the experience of reviewers or the variable quality of the review objects, and purely statistical variation due to the effects of Poisson statistics when defects are counted. Due to this mixture of causes of variation, neither of the fundamental assumptions of the two groups of control charts (XmR-Charts, u-Charts) presented in FIG. 1 and FIG. 2 hold for typical software engineering processes. Therefore the usual control chart techniques, which are included in many standard statistics software packages, can not be applied directly to many software engineering processes.

The following example will once more illustrate the above mentioned problem holding for processes that are affected by various sources of variation. This problem occurs especially for software process activities quite often. When analyzing the defect detection rate as a measure for review efficiency, control charts for Poisson processes (e.g. u-Charts) cannot be applied as they assume the there is only variation due to Poisson statistics, which is not true since there is also variation in review efficiency related to experience of the reviewers. On the other hands the control charts for variable data (e.g. XmR-Charts) assume that, in a stable review process, the defect detection rate should stay within the range defined by the empirically determined control limits, which ignores that due to statistical effects there will be much larger variation in the rate for smaller reviews (few defects found in small documents) than in larger reviews (many defects found in larger documents).

One approach to analyze the performance of processes that are affected by various sources of variation is to design controlled experiments to separate the different types of variation and analyze the resulting data from the experimental setup with the appropriate techniques for the corresponding idealized situation. This approach can be used in an organization to evaluate potential levers for process improvement, but the need to perform controlled experiments to get suitable data for analysis rules out any application in real time on real data in real projects. Therefore the question of whether the performance of, say, the review process in the current software engineering project is stable, is beyond the reach of such approach.

Another approach to analyze the performance of processes that are affected by various sources of variation is to divide the available data into subgroups with equal area of opportunity, so that for each subgroup there is a unique contribution of purely statistical variation, which then allows to apply control charts for variable data. However, in software engineering projects the number of data points is often rather limited (e.g. number of reviews performed), and by organizing the data into many subgroups the sample size then becomes too small for performing any statistical analysis.

The new and inventive ZmR-Chart presented in FIG. 3 overcomes the above mentioned drawbacks and problems. In the exemplary ZmR-Chart depicted in FIG. 3 the metric data describing the process performance (e.g. detected defects per review effort) is transformed into the distance from the centerline (mean value), normalized in units of the expected variation due to Poisson effects. This transformation is adopted from u-Charts or z-Charts which are used to analyze Poisson processes with variable area of opportunity. However, whereas in u-Charts or z-Charts the control limits are calculated based on the assumption that the process data follows Poisson statistics, the innovation here is that empirical natural process limits UNPL (Upper Natural Process Limit) and LNPL (Lower Natural Process Limit) are derived from the moving average of the individual data points as in XmR-Charts.

The shaded region between the control limits UCL (Upper Control Limit) and LCL (Lower Control Limit) in FIG. 3 is the range of variability in process performance that would be expected from purely Poisson statistics. The control limits in FIG. 3 are defined as $2\sigma$ limits, where $\sigma$ is the standard deviation due to Poisson statistics, which correspond to roughly 95% confidence intervals. The large number of data points outside the shaded region indicates that Poisson statistics cannot be the only source of variation in the exemplary data shown in FIG. 3.

The vertical axis in FIG. 3 is the derived metric z which is obtained by transforming the original data x into the distance from the centerline $<x>$, normalized in units of the expected variation due to Poisson effects.

The exemplary ZmR-Chart reveals that in the process performance data presented in FIG. 3 there are only two outliers beyond the natural process limits which should then be analyzed for assignable causes, whereas the XmR-Chart for the same data set presented in FIG. 1 indicates the wrong data points as outliers, and the u-Chart for the same data set presented in FIG. 2 only shows that there are many data points beyond the Poisson control limits, which is of no use for identifying and removing assignable causes.

The new and innovative step of the ZmR-Chart presented in FIG. 3 is to integrate different aspects of distinct control chart techniques for variables and attributes data into a single combined technique that allows to analyze the performance data of software engineering processes which are affected both by intrinsic process variation and purely statistical variation. Performance data of software engineering processes which are affected by different types of variation can thus be analyzed in a single type of control chart. Instead of having to perform controlled experiments to separate different causes of variation, this new technique makes it feasible to analyze the actual data of real projects instantly in a single step.

The actual performance data from real projects (e.g. software projects) can be analyzed as is, and the results are applicable to the underlying project. There is no need for the design of controlled experiments to separate individual causes of variation. Also there is also no need for subgrouping data according to different areas of opportunity. By comparing the empirical limits with the theoretical limits according to Poisson statistics, the portion of the overall variation due to intrinsic process variation can be directly calculated. Thus it is easy to determine whether the main cause for a recognized variation in a process is intrinsic process variability or Poisson statistics. Therefore a reasonable and mathematically confirmed decision can be made whether process improvement activities for the analyzed process make sense. If a large or the most portion of variation is based on Poisson statistics, performing process improvement activities don't make sense. So the available budget for process improvement activities can be used specific and well-directed.

The ZmR chart technique has following advantages especially in view of software processes:

Effects of Poisson statistics are taken into account by using an appropriate variable transformation. Effects of intrinsic process variation are taken into account by deriving natural process limits from the moving ranges of the empirical data.

The example which uses the same data throughout the different chart types demonstrates that both the XmR and u chart technique did not reveal the true outliers.

Moreover, measuring the empirical natural process variation in units of the expected variation due to Poisson effects allows to determine directly the contribution of intrinsic process variation to the observed variation in the measured process attribute.

Figure 4:
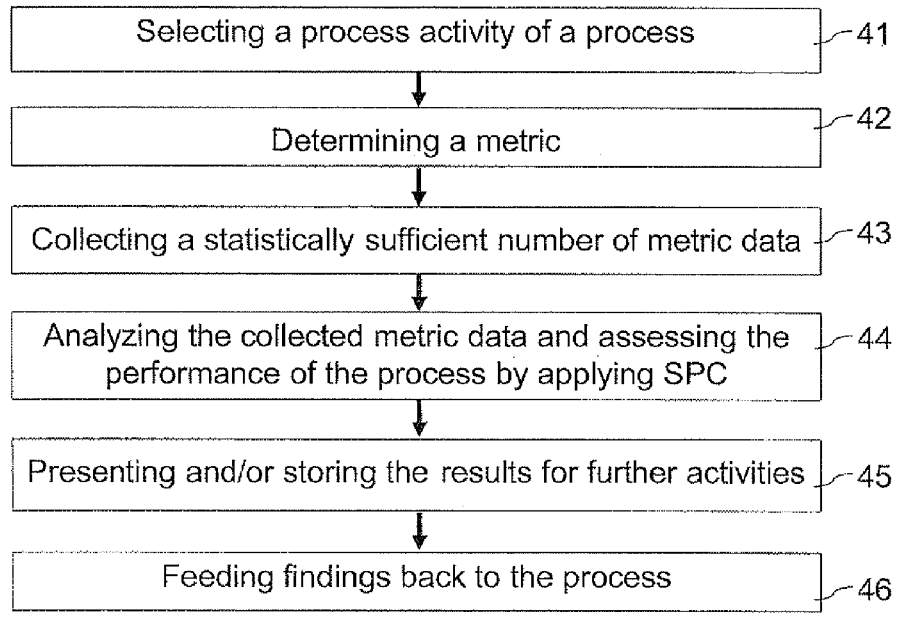
FIG. 4 shows an exemplary flowchart for performing the present invention.

FIG. 4 shows an exemplary flowchart for performing the present invention. In step 41 a process activity to be analyzed is selected. Typical process activities in software development processes are for instance reviews (e.g. for requirement, design or architecture specifications), inspections, or tests (functional, non functional tests).

Step 42 comprises determining a metric describing the performance of the selected process activity. The metric can be defined by a measurable rate (e.g. found defects divided by review effort). Effort in this context can be e.g. consumed time or used manpower).

Step 43 comprises collecting a statistically sufficient number of metric data on the base of the selected process activities performed. A sufficient amount of metric data is necessary for a sound and significant statistical base.

Step 44 comprises analyzing the collected metric data and assessing the performance of the software development process activity by applying statistical process control techniques, wherein a variation of the performance is affected by intrinsic process variation and Poisson effects, wherein the collected metric data are each transformed into a distance from a centerline defined by a mean value of the metric data, whereby the metric data are normalized in units of an expected variation due to Poisson effects, wherein as control limits empirical natural process limits are determined, derived from a moving average of the transformed metric data. The metric data describing the process performance (e.g. detected defects per review effort) is transformed into the distance from the centerline (mean value), normalized in units of the expected variation due to Poisson effects. This transformation is adopted from u-Charts or z-Charts which are used to analyze Poisson processes with variable area of opportunity. However, whereas in u-Charts or z-Charts the control limits are calculated based on the assumption that the process data follows Poisson statistics, the innovation here is that empirical natural process limits are derived from the moving average of the individual data points as in XmR-Charts.

By comparing the empirical limits with the theoretical limits according to Poisson statistics, the portion of the overall variation due to intrinsic process variation can be directly calculated. The transformation of the data, the calculation of empirical process behavior limits, and the drawing of the corresponding control charts (ZmR-Charts) can be realized with standard spreadsheet software.

Step 45 comprises presenting (e.g. in a report) and/or storing (e.g. in a data base or web page) the results (e.g. the graphical representation of the results as ZmR-Chart). This is useful for further activities. The documented results respectively the findings can be the starting point for derived and triggered process improvement activities. Storing results of the assessed performance of the software development process activity in a data base, a spreadsheet, a word processor, a XML-file or a HTML-file. This supports the documentation of the gained results and findings, and furthermore the results and findings can be easily disseminated electronically.

Step 46 comprises feeding back the results and findings to the underlying process. This is possible because with the inventive ZmR-Chart technique assignable causes to outliers can be identified and used to directly correct the underlying process (e.g. software development process). The actual performance data from real projects can be analyzed as is, and the results are applicable to the project. The results of assessing the performance of the software development process activity are used to identify assignable causes for outliers being fed back to a current software development project for direct corrections in the respective process activity. There is no need for the design of controlled experiments to separate individual causes of variation. Also there is no need for subgrouping data according to different areas of opportunity.

Steps 45 and 46 are optional for performing the method.

The invention provides following further embodiments and benefits:

Directly calculating a portion of a overall variation due to intrinsic process variation by comparing the empirical natural process limits with theoretical limits according to the Poisson effects. Therefore the portions of variation based on purely statistical effects or based on intrinsic process variation can be easily and automatically determined. If the variation is mainly caused by purely statistical effects, improvement activities are not promising.

Performing the method under control of a computer program. This allows to perform the method automatically and reproducibly. Providing the computer program on a data carrier allows to sell the program with the instruction to perform the method automatically to $3^{rd}$ parties (e.g. customers).

Performance data of software engineering processes which are affected by different types of variation can be analyzed in a single type of control chart.

Instead of having to perform controlled experiments to separate different causes of variation, this new technique makes it feasible to analyze the actual data of real projects instantly in a single step.

The maximum possible reduction in the overall process performance variation through process improvement measures which aim at the intrinsic process variation can be calculated from the available data.

No special purpose statistics software packages are needed to analyze the stability and performance of software engineering processes.

The application of the new and inventive control chart technique (ZmR-Charts) allows to answer the following questions:

Is the review process performed consistently and is the process performance stable?

Which reviews are outside the expected natural process limits and should be analyzed in detail for assignable causes?

How much do intrinsic variation in the review process and statistical variation due to Poisson effects contribute each to the observable overall variation in review efficiency?

Figure 5:
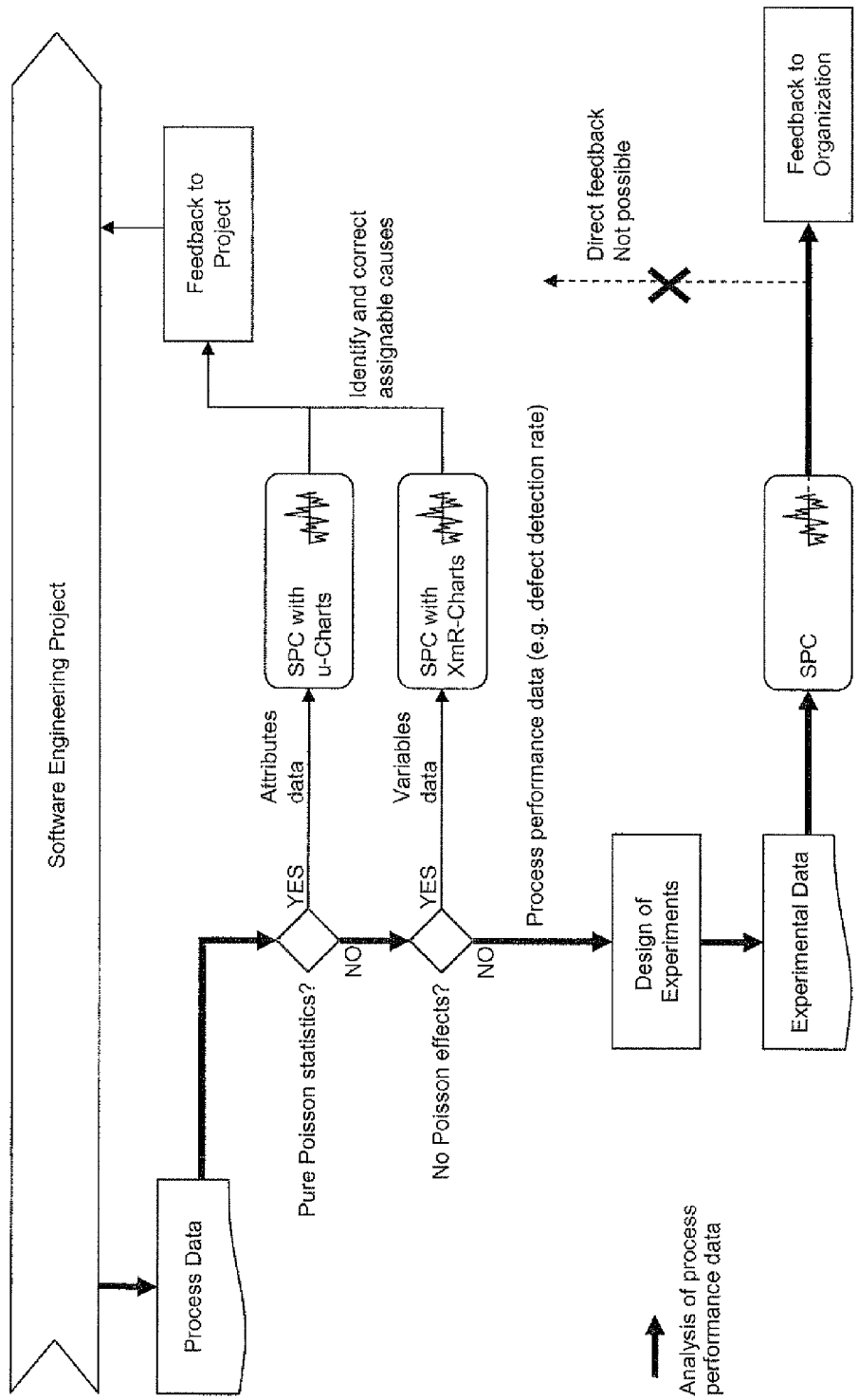
FIG. 5 shows an exemplary process flow for improving software engineering processes using statistical process control techniques based on u-Charts and/or XmR-Charts.

FIG. 5 shows an exemplary process flow for improving software engineering processes and managing software engineering projects using statistical process control techniques based on classic u-Charts and/or XmR-Charts. U-Charts are used for analyzing attributes data based on pure Poisson statistics. XmR-Charts are used for analyzing variables data based on the assumption that there are no Poisson effects. For analyzing the performance of processes that are affected by various sources of variation (e.g. defect detection rate) controlled experiments have to be designed to separate the different types of variation and analyze the resulting data from the experimental setup with the appropriate techniques for the corresponding idealized situation. This approach can be used in an organization to evaluate potential levers for process improvement, but the need to perform controlled experiments to get suitable data for analysis rules out any application in real time on real data in real projects. Therefore the question of whether the performance of, say, the review process in the current software engineering project is stable, is beyond the reach of such approach. On the base of the analyzed experimental data there is no direct feedback to the project, nor to the software engineering process possible.

Figure 6:
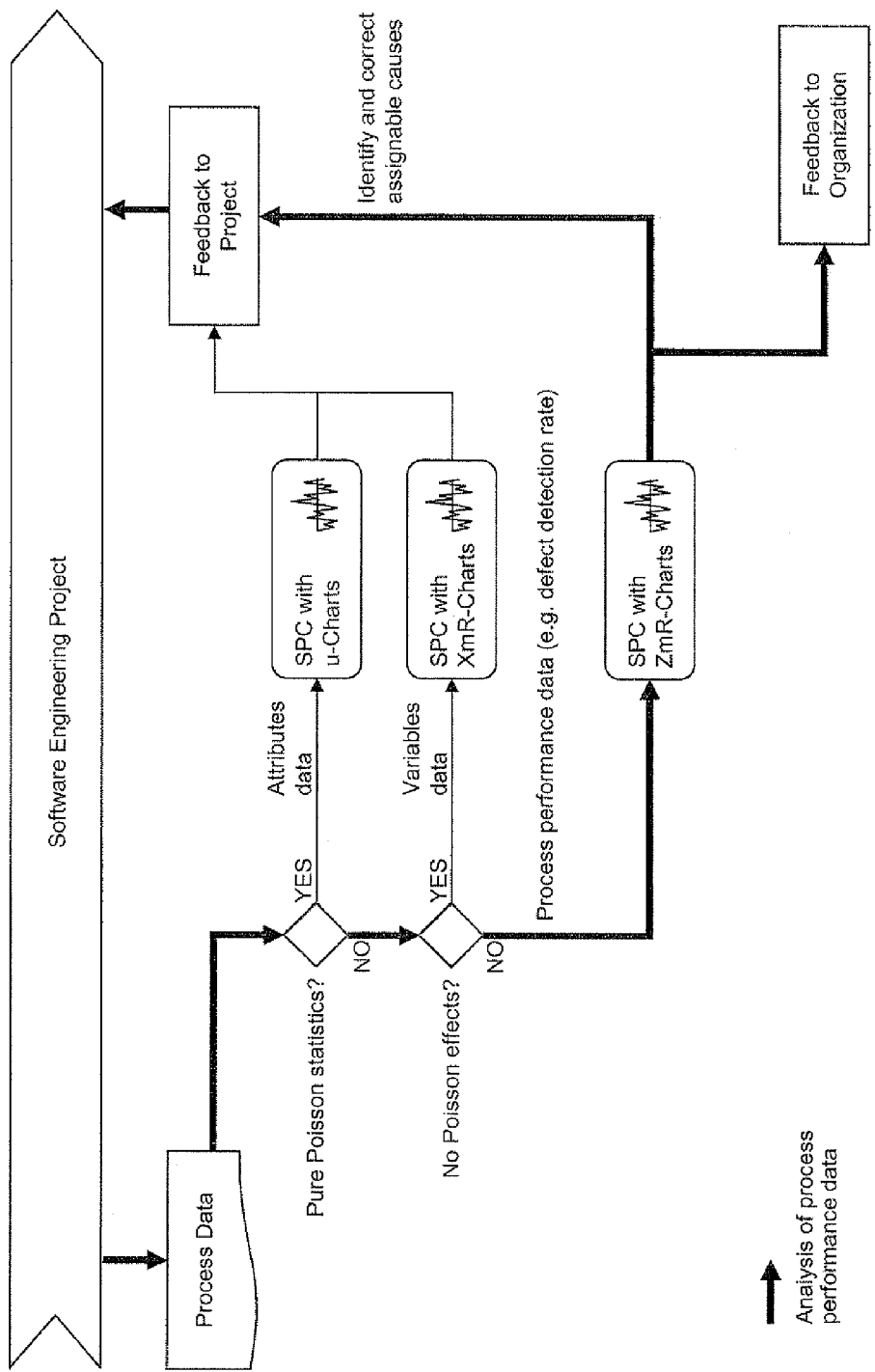
FIG. 6 shows an exemplary process flow for improving software engineering processes and managing software engineering projects using statistical process control techniques based on u-Charts, XmR-Charts, and furthermore based on ZmR-Charts.

FIG. 6 shows an exemplary process flow for improving software engineering processes and managing software engineering projects using the inventive ZmR-Chart technique. By applying the ZmR-Chart technique the actual performance data (e.g. defect detection rate gained from reviews, inspections, tests etc.) from real projects can be analyzed as is, and the results are applicable to the respective project and to the underlying engineering or development process. Also there is no need for subgrouping data according to different areas of opportunity. Applying the new and inventive ZmR-Chart approach the results of performance analysis can be used for direct feedback to the project and to the software engineering process. Furthermore feedback to the organization (e.g. engineering department, chief technology officer) is feasible.

Figure 7:
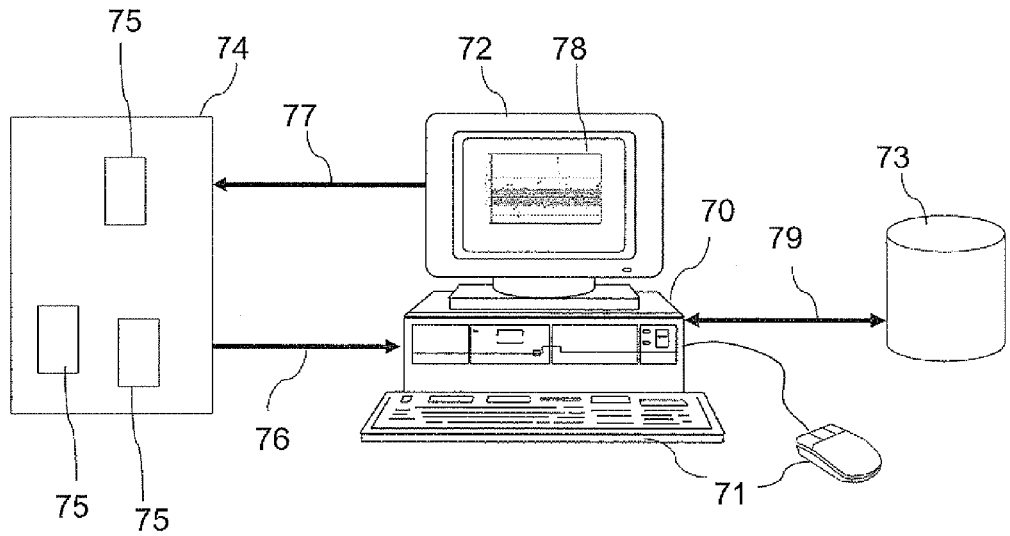
FIG. 7 shows an exemplary implementation approach for the present invention.

FIG. 7 shows an exemplary implementation approach for the present invention (method and system). The ZmR-Chart technique can be implemented and/or supported by a computer system with processor unit 70, input devices 71 (e.g. keyboard, mouse), display unit 72 (e.g. monitor). On the monitor 72 a ZmR-Chart 78 is exemplary displayed. E.g. process data and results of performance analysis steps can be stored for further processing, dissemination, archiving, or documentation in a data base 73. It is also feasible to store this data on a web page of a company Intranet or Internet. As format for this data for example a markup language can be used (e.g. XML, HTML). Thus this data can be easily further processed and easily used for further applications. The data base 73 (e.g. a relational data base, a data base server) is connected to the computer system 70 by a bidirectional communication line 79. The box 74 on the left hand side of FIG. 7 represents exemplarily a process activity (e.g. walk through reviews in software development projects) to be analyzed. The results of process activities is typically documented in process or project artifacts 75 (e.g. minutes or protocols of review sessions). Typically these artifacts contain the process data used to analyze the performance of the respective process activity. This process data gained from the process artifacts are the base for applying the ZmR-Chart technique. The arrow 76 indicates that the process data are fed to the computer system 70 to create ZmR-Charts. From the ZmR-Charts assignable causes of problems (represented by outliers in the ZmR-Chart) can be identified. The identification of assignable causes of problems makes it possible to directly correct the identified causes in the analyzed process activity 74. This feed back from the ZmR-Chart to the process activity is indicated by arrow 77. The transformation of the data, the calculation of empirical process behavior limits, and the drawing of the corresponding ZmR control charts can be realized with standard spreadsheet software using a commercial off the shelf computer system 70. The approach described in FIG. 7 provides a closed control loop by using XmR-Charts: The finding of analyzing the process activity 74 are transferred (via communication line 76) to a tool generating ZmR-Charts with a computer system 70,72. The results (identified assignable causes) derived from analyzing the ZmR-Charts will be fed back to the process activity 74.

It is obvious that the results derived from ZmR-Charts can be used in projects (process instances) and in the process itself Furthermore it is obvious that the ZmR-Chart technique is not limited to software process activities. In fact the ZmR-Chart technique is applicable to all kind of processes having different causes of variation.

The article "Software Acquisition Gold Practice Statistical Process Control" (accessible on the Internet URL <https://goldpractices.com/practices/spc/index.php>) describes the application of statistical process control (SPC) to software development processes. This article is incorporated by reference in this patent application in its entirety.

In software engineering, the performance or efficiency of individual process steps is typically defined as some sort of rate such as the number of detected defects divided by the effort spent for review or testing. In this situation, the variation in the data always reflects a mixture of intrinsic process variation caused by, for examples human factors such as the experience of reviewers or the variable quality of the review objects, and purely statistical variation due to the effects of Poisson statistics when defects are counted. Due to this mixture of causes of variation no conventional statistical process control chart holds for the constraints of typical software engineering processes. A new statistical process control (SPC) approach (method and system) is presented to overcome the mentioned problems.

We claim:

1. A method for analyzing the performance of software development process activities, the method implemented on a computer system having a processor unit and comprising:
    selecting a process activity to be analyzed;
    determining a metric describing the performance of the selected process activity;
    collecting a number of metric data on the base of the selected process activities performed;
    analyzing the collected metric data and assessing the performance of the software development process activity by:
        (a) applying statistical process control (SPC) techniques, wherein a variation of the performance is affected by different types of variation comprising intrinsic process variation and Poisson effects, wherein a first SPC technique is applied with an assumption that the type of variation is only affected by Poisson effects to produce control charts for attributes data, and wherein a second SPC technique is applied with an assumption that the type of variation is only affected by intrinsic process variation to produce control charts for variable data;
        (b) integrating aspects of the control charts produced by the first and second SPC techniques into a combined SPC technique to address a mixture of the different types of variation by transformation of the collected metric data,
    wherein the collected metric data are each transformed into transformed metric data, adopted from control charts produced by the first SPC technique, comprising a distance from a centerline defined by a mean value of the metric data, wherein the metric data are normalized in units of an expected variation due to Poisson effects,
    wherein empirical natural process limits derived from a moving average of the transformed metric data are used to determine upper and lower control limits, adopted from control charts produced by the second SPC technique and
    wherein the transformed metric data in relation to the upper and lower control limits are used to assess the performance of the process.

2. The method according to claim 1, wherein the transformation of the collected metric data into transformed metric data is adopted from control charts for attributes data comprising z-Charts or u-Charts that analyze the attributes data based on Poisson statistics.

3. The method according to claim 1, wherein determining the upper and lower control limits is adopted from control charts for variable data comprising (XmR)-Charts with individual observations (X) and moving ranges (MR), wherein the XmR Charts analyze variables data and ignore Poisson effects.

4. The method according to claim 1, further comprising:
    providing results of the assessed performance of the software development process activity as a control chart in the form of a (ZmR)-Chart with individual observations (Z) and moving ranges (MR), the chart comprising the centerline, the upper and lower control limits, and the transformed metric data plotted on the control chart, wherein transformed metric data plotted outside the control limits comprise outliers.

5. The method according to claim 4, wherein the control chart is generated by a spreadsheet program.

6. The method according to claim 1, further comprising: storing results of the assessed performance of the software development process activity in a data base, a spreadsheet, a word processor, a Extensible Markup Language (XML)-file or a HyperText Markup Language (HTML)-file.

7. The method according to claim 1, wherein a portion of an overall variation due to intrinsic process variation is directly calculated by comparing the empirical natural process limits with theoretical limits according to the Poisson effects.

8. The method according to claim 1, wherein the results of assessing the performance of the software development process activity are used to identify assignable causes for outliers being fed back to a current software development project for direct corrections in the respective process activity.

9. The method according to claim 1, wherein the metric is defined by a measurable rate.

10. The method according to claim 1, wherein said method is performed under control of a computer program.

11. The method according to claim 10, wherein the computer program is read from a data carrier.

12. A method implemented on a computer system having a processor unit for presenting performance data of software development process activities in a graphical chart, comprising assessing the performance data based on statistical process control (SPC) techniques, wherein a first SPC technique is applied with an assumption that the type of variation is only affected by Poisson effects to produce control charts for attributes data, and wherein a second SPC technique is applied with an assumption that the type of variation is only affected by intrinsic process variation to produce control charts for variable data;

integrating aspects of the control charts produced by the first and second SPC techniques into a combined SPC technique to address a mixture of the different types of variation by transformation of the collected metric data, wherein from control charts produced by the first SPC technique collected metric data are each transformed into transformed metric data comprising a distance from a centerline defined by a mean value of the metric data, wherein the metric data are normalized in units of an expected variation due to Poisson effects, wherein from control charts produced by the second SPC technique empirical natural process limits are derived from a moving average of the transformed metric data and are used to determine upper and lower control limits, wherein the distance between the centerline and each of the transformed metric data defines a probability of occurrence and outliers beyond the upper and lower control limits are interpreted of being provoked by an assignable cause, and depicting the performance data in a graphical statistical process control chart comprising the centerline, the upper and lower control limits, and the transformed metric data plotted on the control chart.

13. A system for analyzing the performance of software development process activities using a metric describing the performance of the selected process activity, the system comprising:

means for collecting a number of metric data on the base of the selected process activities performed;

a first computing unit comprising a processor unit programmed to execute instructions for analyzing collected metric data and assessing the performance of the software development process activity by applying statistical process control (SPC) techniques, wherein a variation of the performance is affected by different types of variation comprising intrinsic process variation and Poisson effects, wherein a first SPC technique is applied with an assumption that the type of variation is only affected by Poisson effects to produce control charts for attributes data, and wherein a second SPC technique is applied with an assumption that the type of variation is only affected by intrinsic process variation to produce control charts for variable data;

a second computing unit comprising a processor unit programmed to execute instructions for integrating aspects of the control charts produced by the first and second SPC techniques into a combined SPC technique to address a mixture of the different types of variation by transformation of the collected metric data, wherein the collected metric data are each transformed into transformed metric data, adopted from control charts produced by the first SPC technique, comprising a distance from a centerline defined by a mean value of the metric data, wherein the metric data are normalized in units of an expected variation due to Poisson effects, and wherein empirical natural process limits derived from a moving average of the transformed metric data are used to determine upper and lower control limits, adopted from control charts produced by the second SPC technique, and wherein the transformed metric data in relation to the upper and lower control limits are used to assess the performance of the process.

14. The method according to claim 12, wherein the transformed metric data is derived from control charts for attributes data comprising z-Charts or u-Charts that analyze the attributes data based on Poisson statistics.

15. The method according to claim 12, wherein the upper and lower control limits are derived from control charts for variable data comprising (XmR)-Charts with individual observations (X) and moving ranges (MR), wherein the XmR Charts analyze variables data and ignore Poisson effects.

16. The method according to claim 12, wherein transformed metric data plotted outside the control limits on the graphical statistical process control chart comprise outliers that are further analyzed for assignable causes and fed back to a current software development project for direct corrections in the respective process activity.

17. The system according to claim 13, wherein the transformed metric data is derived from control charts for attributes data comprising z-Charts or u-Charts that analyze the attributes data based on Poisson statistics.

18. The system according to claim 13, wherein the upper and lower control limits are derived from control charts for variable data comprising (XmR)-Charts with individual observations (X) and moving ranges (MR), wherein the XmR Charts analyze variables data and ignore Poisson effects.

19. The system according to claim 13, wherein transformed metric data plotted outside the control limits comprise outliers that are further analyzed for assignable causes and fed back to a current software development project for direct corrections in the respective process activity.

20. The method according to claim 1, wherein the metric is defined by a defect detection rate.

* * * * *